(12) United States Patent
Chevret et al.

(10) Patent No.: US 7,121,142 B2
(45) Date of Patent: Oct. 17, 2006

(54) INSTALLATION AND METHOD FOR ACOUSTIC MEASUREMENT WITH MARKER MICROPHONE IN SPACE

(75) Inventors: Patrick Chevret, Montluel (FR); Jean-Pierre Demars, L'Arbresle (FR); Daniel Vaucher de la Croix, La Tour du Pin (FR); Jean-Michel Villiot, Villefranche (FR)

(73) Assignee: Metravib R.D.S., Limonest (FR)

( * ) Notice: Subject to any disclaimer, the term of this patent is extended or adjusted under 35 U.S.C. 154(b) by 200 days.

(21) Appl. No.: 10/502,654

(22) PCT Filed: Oct. 7, 2003

(86) PCT No.: PCT/FR03/02937

§ 371 (c)(1),
(2), (4) Date: Aug. 3, 2004

(87) PCT Pub. No.: WO2004/034083

PCT Pub. Date: Apr. 22, 2004

(65) Prior Publication Data

US 2005/0076717 A1    Apr. 14, 2005

(30) Foreign Application Priority Data

Oct. 8, 2002  (FR) .................................. 02 12456

(51) Int. Cl.
*G01H 17/00* (2006.01)
(52) U.S. Cl. .................... 73/646; 73/649; 73/866.5

(58) Field of Classification Search .................... None
See application file for complete search history.

(56) References Cited

U.S. PATENT DOCUMENTS

| | | | |
|---|---|---|---|
| 4,628,737 A | 12/1986 | Charles et al. | |
| 4,811,250 A | 3/1989 | Steber et al. | |
| 5,031,159 A | * 7/1991 | Rouquette | 367/125 |
| 6,470,002 B1 | * 10/2002 | Jones et al. | 370/345 |
| 6,501,414 B1 | * 12/2002 | Arndt et al. | 342/22 |

FOREIGN PATENT DOCUMENTS

DE        2704511        8/1978

* cited by examiner

*Primary Examiner*—Daniel S. Larkin
*Assistant Examiner*—Rose M. Miller
(74) *Attorney, Agent, or Firm*—Dennison, Schultz & MacDonald

(57) ABSTRACT

An acoustic measurement installation including acoustic measurement instrumentation, in particular an acoustic measurement antenna fitted with at least one microphone; a positioning system for positioning the antenna by ultrasound and including at least one ultrasound emitter mounted on the antenna at a known distance relative to the microphone and an ultrasound receiver base for receiving the signals emitted by each emitter and adapted to determine the position of each emitter; and a control unit for controlling the positioning system for positioning the antenna and the acoustic measurement instrumentation. The control system is adapted during a first stage to cause each emitter to emit in succession in order to determine the position of the antenna, and during a second stage to cause the microphones to perform acquisition in order to implement acoustic measurement using the measurement instrumentation.

9 Claims, 2 Drawing Sheets

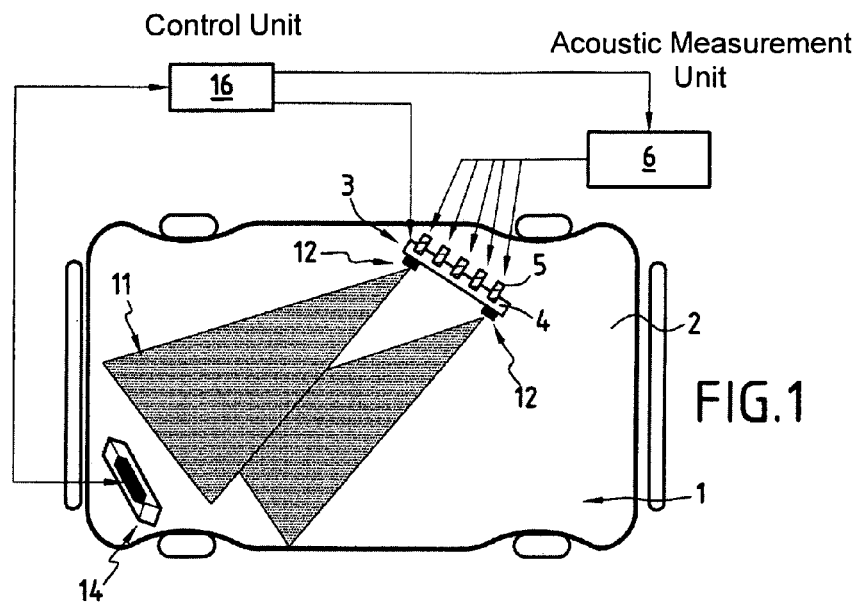
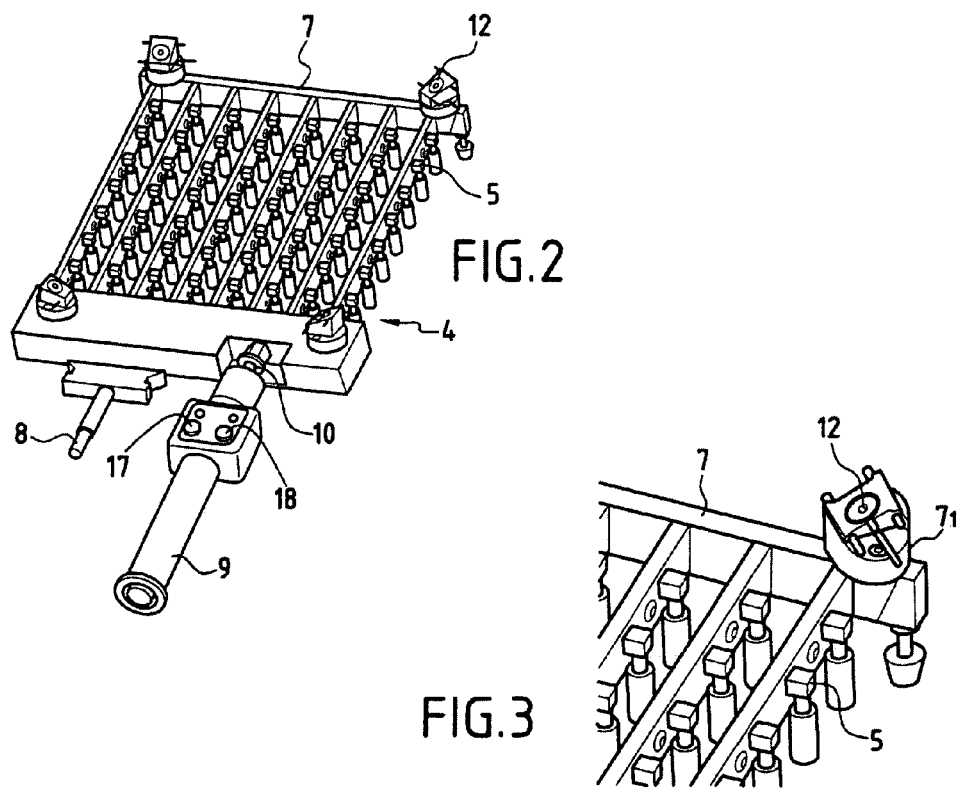

INSTALLATION AND METHOD FOR ACOUSTIC MEASUREMENT WITH MARKER MICROPHONE IN SPACE

This application is a filing under 35 USC 371 of PCT/FR2003/002937, filed Oct. 7, 2003.

The present invention relates to the technical field of acoustic measurement in the broad sense, in a measurement zone in which position in three dimensions needs to be known.

More precisely, the present invention relates to the field of measuring an acoustic field coming from a source that can be direct or indirect, single or multiple, said measurement being performed in a zone that is identified in three dimensions and that is situated in the environment of the sound source.

A particularly advantageous application of the invention lies in performing acoustic measurements inside a volume such as a room inside a building or transport means (cabin or vehicle) or in the environment of a sound source such as an engine or a machine.

In numerous fields, there is a need to proceed with acoustic measurements in order to characterize one or more sound sources, for the purpose, for example, of limiting the influence thereof, in particular. For example, it is necessary to perform acoustic measurements outside in order to characterize a (single or multiple) source or inside a vehicle cabin in order to determine the characteristics of the sound field heard in order in particular to limit the effects thereof.

In order to proceed with acoustic measurements, it is known to use an acoustic measurement installation comprising measurement instrumentation having an acoustic measurement antenna which is generally fitted with a series of microphones. Such an acoustic measurement antenna is generally carried by a robot arm whose position in three dimensions is determined by measurement sensors.

Such a measurement installation does not give satisfaction in practice since it is of considerable weight and size and is not suitable for use inside a volume that is restricted or cluttered, such as a vehicle cabin.

The invention thus seeks to remedy the above-mentioned drawbacks by proposing an acoustic measurement installation designed to present small volume while also making it possible to pick up accurately and reliably measurements of an acoustic field coming from one or more sound sources.

To achieve such an object, the invention provides an acoustic measurement installation comprising:

acoustic measurement instrumentation comprising in particular an acoustic measurement antenna fitted with at least one microphone;

a positioning system for positioning the antenna by ultrasound, the positioning system comprising:

at least one ultrasound emitter mounted on the antenna at a known distance relative to the microphone; and an ultrasound receiver base for receiving the signals emitted by each emitter and adapted to determine the position of each emitter in three dimensions;

and a control unit for controlling the positioning system for positioning the antenna and the acoustic measurement instrumentation, the control system being adapted during a first stage to cause each emitter to emit in succession in order to determine the position of the antenna in three dimensions, and during a second stage to cause the microphones to perform acquisition in order to implement acoustic measurement using the measurement instrumentation.

The invention also seeks to provide a method adapted to perform acoustic measurements in a zone that is identified in three dimensions with great accuracy, while still being simple to implement.

To achieve such an object, the acoustic measurement method of the invention comprises the following steps:

fitting an acoustic measurement antenna comprising at least one microphone with at least one ultrasound emitter mounted at a known distance from the microphone;

placing the acoustic measurement antenna in a position that is stationary relative to the sound source;

placing an ultrasound receiver base to face the antenna, the receiver base being adapted to receive an ultrasound signal emitted by the ultrasound emitter and to determine the position of the emitter;

causing each ultrasound emitter to emit in succession so as to enable the ultrasound receiver base to determine the position of each emitter and consequently of each microphone; and after the end of the stage of causing all of the ultrasound emitters to emit, controlling the microphones to operate in acquisition so as to perform the acoustic measurement of the sound source.

In a variant implementation, the method of the invention further comprises the following steps:

placing a reference structure in a stationary position, the structure defining at least one reference marker having at least three points; and causing each ultrasound emitter of an acoustic pointer fitted with at least two emitters to emit in succession, and to do so for each position of the pointer placed on each point of the reference marker so as to enable the positions of the points of the reference marker to be determined in a frame of reference associated with the position of the ultrasound receiver base.

According to another characteristic of the invention, the method of the invention comprises, in addition to the preceding steps, and in order to enlarge the coverage of the acoustic measurement, the following steps:

moving the ultrasound receiver base to place it in a second stationary position;

causing each ultrasound emitter of the pointer for each position of the pointer placed on each point of the reference marker to emit in succession in such a manner as to enable the positions of the points of the reference marker to be determined in another frame of reference associated with the second position of the ultrasound receiver base; and on the basis of the positions of the points of the reference marker for the first and second positions of the ultrasound receiver base, determining the positions of the microphones in a single frame of reference.

Various other characteristics appear from the description below made with reference to the accompanying drawings which show, as non-limiting examples, embodiments of the subject matter of the invention.

FIG. 1 is a diagrammatic view showing an example of an application of an acoustic measuring installation in accordance with the invention.

FIG. 2 is a general view of an acoustic measurement antenna forming part of the installation in accordance with the invention.

FIG. 3 is a detail view of the acoustic measurement antenna shown in FIG. 2.

Figure 4:
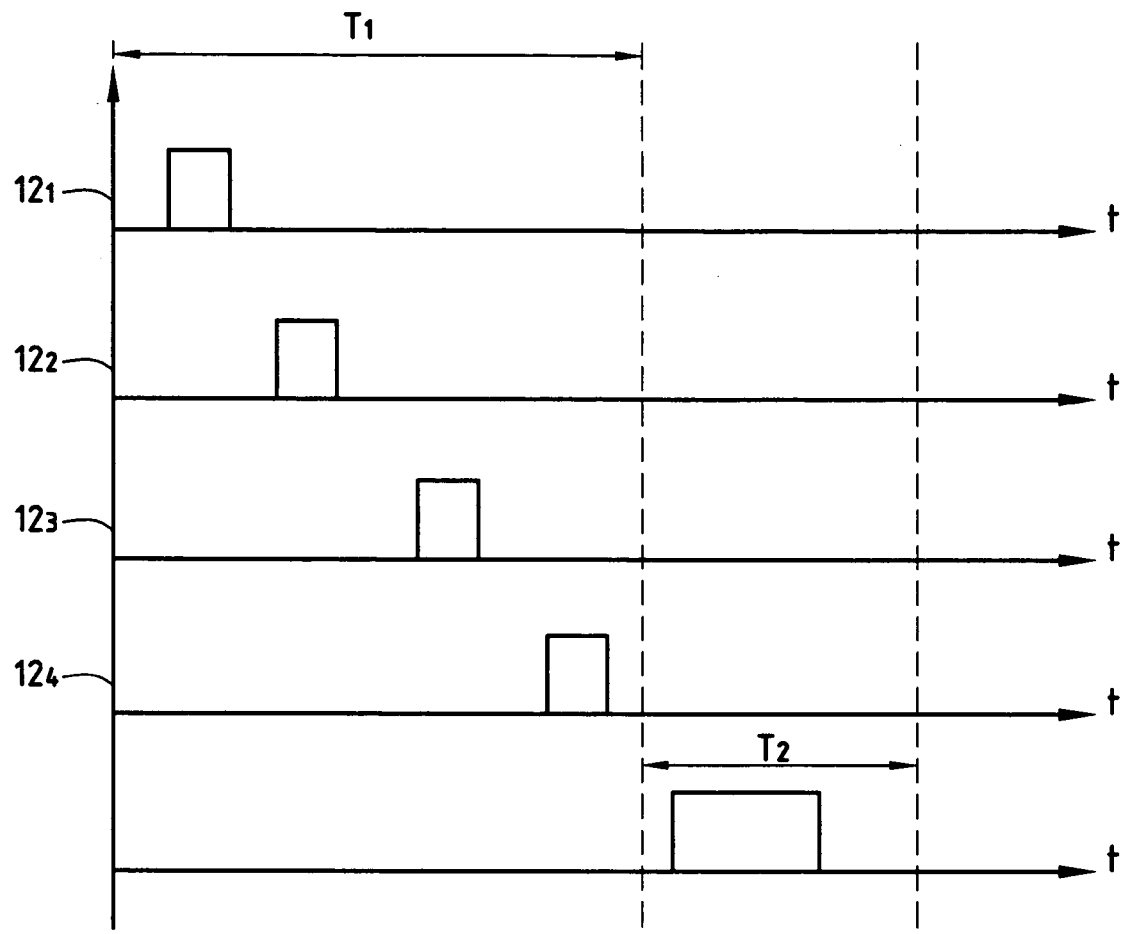
FIG. 4 is a timing chart showing how the acoustic measurement installation in accordance with the invention operates.

As can be seen more clearly in FIG. 1, the present invention relates to an installation 1 for performing an acoustic measurement that needs to be positioned in three dimensions. Thus, the installation 1 is adapted to act at a geometrically identified location to pick up the sound field that comes from one or more sound sources directly or indirectly, e.g. because a wall is transparent, because of sound leakage, etc. In a particularly advantageous manner, the installation 1 is adapted to perform acoustic measurement inside a closed enclosure 2, which in the example shown is constituted by a vehicle cabin. In this embodiment (and also in general), the sound source may be a single source (engine noise), or multiple sources (engine noise together with noise coming from outside the cabin and heard inside the cabin). Naturally, the installation 1 of the invention may involve other applications such as performing acoustic measurements inside a dwelling or acoustic measurements performed in an open or confined environment of a sound source, such as a machine, for example.

The installation 1 comprises instrumentation 3 for acoustic measurement comprising in particular an acoustic measurement antenna 4 fitted with at least one microphone, and in the example shown with a series of microphones 5, with the number of microphones depending on the desired accuracy, on the frequency range of interest, and on the extent of the zone in which acoustic measurements are to be performed. In conventional manner, the microphones 5 are connected to an acoustic measurement unit 6 for measuring signals picked up by the microphones 5. The various processing functions of the unit 6 are not described in the description below since they are well known and form part of the technical knowledge of the person skilled in the art.

As can be seen more precisely in FIGS. 2 and 3, the acoustic measurement antenna 4 in the example shown comprises sixty-four microphones 5 extending in a plane and distributed over eight columns and eight rows. The microphones 5 are mounted on a support 7 that forms a kind of frame with cross-members. The microphones 5 are connected to the processor unit 6 by a connection 8.

According to a preferred embodiment characteristic, the acoustic measurement antenna 4 is fitted with a member 9 for holding the antenna in position, and in the example shown this is constituted by a holding and control handle, as explained in the description below. This handle 9 which extends from the support 7 thus makes available an antenna 4 that is of portable nature. The handle 9 is preferably mounted to move relative to the acoustic measurement antenna 4. For this purpose, the handle 9 is mounted to move relative to the antenna 4 about a hinge axis 10 enabling it to be pivot relative to the support so as to facilitate positioning the acoustic measurement antenna 4.

The installation 1 also comprises a system 11 enabling the acoustic measurement antenna 4 to be positioned by an ultrasound method. The purpose of this system 11 is to determine the coordinates in three dimensions of the acoustic measurement antenna 4. This positioning system 11 comprises at least one, and in the example shown four, ultrasound emitters 12 mounted on the acoustic measurement antenna 4 at known distances from the microphones 5. It should be understood that each ultrasound emitter 12 must be placed at a known distance from at least one microphone 5 insofar as the microphones 5 are separated from one another by distances that are known. The number of ultrasound emitters 12 depends on the type of antenna used. Thus, the acoustic measurement antenna 4 is fitted:

with an ultrasound emitter 12 when the antenna 4 comprises one microphone 5;

with at least two ultrasound emitters 12 when the antenna 4 comprises a series of microphones 5 disposed linearly;

with at least three ultrasound emitters 12 when the antenna 4 comprises a series of microphones 5 disposed in a plane; and with at least four ultrasound emitters 12 when the antenna 4 comprises a series of microphones 5 disposed in a volume.

In the example shown, the acoustic measurement antenna 4 is plane and is fitted with four ultrasound emitters 12, as a safety precaution in the event of one of the emitters 12 being masked.

The installation 1 also comprises an ultrasound receiver base 14 for receiving the signals emitted by each of the ultrasound emitters 12. This ultrasound receiver base 14 is also adapted to determine the position in three dimensions of each ultrasound emitter 12, and consequently the position in three dimensions of the microphones 5, or more generally of the antenna 4. In known manner, this base 14 uses a direction finding or interferometric method to determine the positions in three dimensions of the ultrasound emitters 12. To this end, the base 14 is fitted with at least three ultrasound receivers and with processor and calculator means for determining the positions in three dimensions of the ultrasound emitters 12, and consequently of the antenna 4.

It should be observed that the accuracy with which the antenna 4 is positioned depends directly on the position of the ultrasound receiver base 4 in the beams from the emitters 12. Typically, best accuracy for emitter position is obtained when the base 14 lies on the axis of the emitter 12. Thus, according to a preferred characteristic of the invention, each ultrasound emitter 12 is mounted on the antenna 4 on a moving support $7_1$ enabling the axis of the emitter 12 to be adjusted relative to the ultrasound receiver base. The moving support $7_1$ which is constituted in the form of a cardan joint, enables the axis of each emitter 12 to be adjusted in two planes.

The installation 1 also comprises a control unit 16 for controlling the positioning system 11 and the acoustic measurement instrumentation 3. This control unit 16 includes means adapted, during a first stage $T_1$ (FIG. 4), to cause each emitter 12 to emit in succession so that the base 14 can determine the position of the antenna 4. At the end of this first stage $T_1$, during a second stage $T_2$, the unit 16 causes the microphones 5 to operate in acquisition in order to perform the acoustic measurements using the acoustic measurement unit 6. The positions of the microphones 5 as determined by the ultrasound receiver base 14 are delivered to the measurement unit 6 so that the geometrical position of each microphone 5 is known and delivered to the acoustic measurement unit 6.

The acoustic measurement installation 1 of the invention operates in a manner that stems directly from the above description. The acoustic measurement method described below relates to performing acoustic measurements inside a motor vehicle cabin 2. Naturally, the method of the invention can be applied in measurement situations that are not confined (in an open medium).

The acoustic measurement antenna 4 is placed in a position that is fixed relative to the sound source. For example, the acoustic measurement antenna 4 is held in a position by an operator carrying the antenna 4 by means of its handle 9. The ultrasound receiver base 14 is placed facing the antenna 4 in a relationship that enables it to be "seen acoustically". The ultrasound receiver base 14 is thus adapted to receive an ultrasound signal as emitted by each ultrasound emitter 12 mounted at known distance from the microphone(s) 5 fitted to the acoustic measurement antenna 4. As can be seen more precisely from FIG. 4, the method consists in causing each of the ultrasound emitters 12 (referenced by references $12_1$, $12_2$, $12_3$, $12_4$) to emit in succession to enable the ultrasound receiver base 14 to determine the position of each ultrasound emitter, and consequently of each microphone 5. For this purpose, the operator causes each ultrasound emitter 12 to emit, e.g. by using a control button 17 placed on the handle 9. Once the ultrasound receiver base 14 has determined the position of the first ultrasound emitter 12, a signal is emitted to stop emission from the ultrasound emitter 12. The operator then causes the second ultrasound emitter 12 to emit so that the ultrasound receiver base 14 can determine its position. This operation is repeated for each of the ultrasound emitters 12, i.e. all four of them in the example shown.

At the end of this first stage $T_1$, the positions in three dimensions of the ultrasound emitters 12, and consequently of the microphones 5 are known. The second stage $T_2$ of the method consists in acquiring acoustic signals (in the audible band) using the microphones 5. For this purpose, the operator causes the microphones 5 to operate in acquisition, e.g. by pressing a control button 18 placed on the handle 9, thereby performing acoustic measurement of the sound source.

The acoustic measurement instrumentation 3, and in particular the processor means 6 serve to pick up and process the signals sensed by each microphone 5, whose position in three dimensions is known and determined by the ultrasound receiver base 14.

It should be observed that the two above-described stages are performed while maintaining the acoustic measurement antenna 4 and the ultrasound receiver base 14 in fixed positions. Naturally, these two stages may subsequently be repeated for other possible positions of the acoustic measurement antenna 4. Putting the antenna 4 in different zones in three dimensions enables the acoustic field to be picked up in different zones at a distance from the ultrasound receiver base 14. Nevertheless, it should be observed that the acoustic measurement antenna 4 must always be placed so as to be "acoustically in sight" of the ultrasound receiver base 14 (i.e. "in sight" in terms of range and angular aperture of the ultrasound beams).

Figure 5:
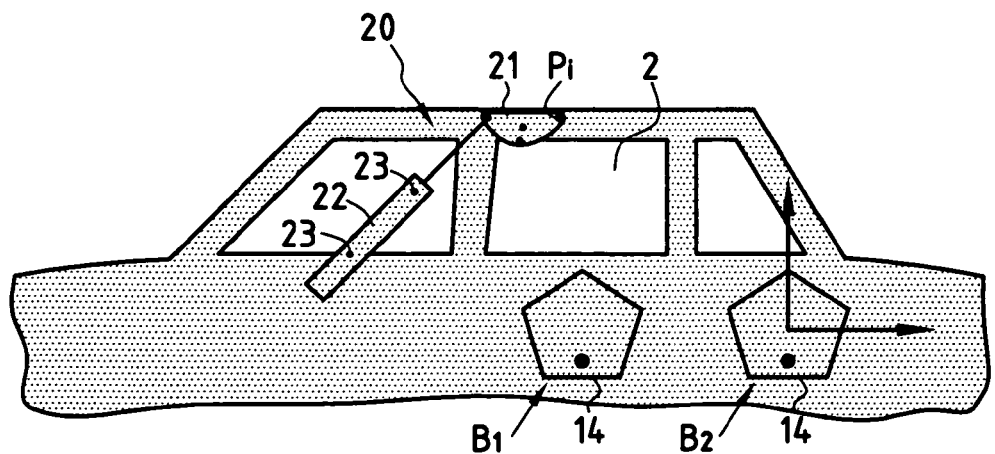
FIG. 5 is a diagram showing a variant embodiment of the acoustic measurement installation in accordance with the invention.

FIG. 5 shows an embodiment in which the space for performing measurements, i.e. for positioning the antenna 4 is increased. In this variant, the installation 1 comprises a system 20 for positioning the ultrasound receiver base 14. Such a positioning system 20 comprises a fixed reference structure 21 defining at least one reference marker having at least three points $P_i$. Such a positioning system 20 also comprises a moving acoustic pointer 22 fitted with at least two ultrasound emitters 23. The positioning system 20 also comprises control and processor means forming part of the control unit 16, for example, and serving to cause the ultrasound emitters 22 of the acoustic pointer 22 to emit in succession for each position of the pointer relative to the points of the reference marker, and for each position $B_1$, $B_2$, . . . , of the receiver base 14 so as to determine the positions of the points of the reference marker in a frame of reference that is associated with each position of the receiver base in order to determine the positions in three dimensions of the antenna 4 in a single common frame of reference.

Implementation of the positioning system 20 for the ultrasound base 14 stems from the above description.

The reference structure 21 is placed in stationary manner inside the volume 2 in which measurements are to be taken. The acoustic pointer 22 is placed on a first point $P_i$ of the reference marker. In this position, the first ultrasound emitter 23 of the pointer is caused to emit so that the ultrasound receiver base 14 determines its position in three dimensions, as described above. The second ultrasound emitter 23 of the acoustic pointer 22 is then caused to emit so that the ultrasound receiver base 14 likewise determines its position in three dimensions. Given that the distance between the two emitters 23 of the acoustic pointer is known, as is the distance between one of the ultrasound emitters 23 and the end of the pointer in contact with the point $P_i$ of the reference marker, the ultrasound receiver base 14 can determine the coordinates of the first point $P_i$ of the reference marker. In conventional manner, the ultrasound receiver base 14 calculates the coordinates using a position-finding or an interferometric method.

The acoustic pointer 22 is then placed on the second point $P_i$ of the reference marker and the acoustic acquisition stage as described above is performed so as to determine the coordinates of the second point $P_i$ of the reference marker. This stage is repeated for the third position of the acoustic pointer 22 placed relative to the third point $P_i$ of the reference marker.

At the end of this acquisition stage, the positions in three dimensions of the points $P_i$ of the reference marker are determined in a frame of reference associated with a position $B_1$ of the ultrasound receiver base 14.

It is thus possible to perform one or more acoustic acquisitions as described above, moving the antenna 4.

When measurements need to be performed outside the acoustic line of sight of the ultrasound receiver base 14 placed in its first position $B_1$, provision can be made to move the ultrasound receiver base 14 into a second position $B_2$ as shown in FIG. 5. In this second stationary position $B_2$, the acoustic pointer 22 is placed on a point $P_i$ of the reference marker and each ultrasound emitter 23 is caused to emit in succession so as to enable the position of each point $P_i$ of the reference marker to be determined using the ultrasound receiver base 14 in the manner described above. The acoustic pointer 22 is moved as described above so as to take up the other two points $P_i$ of the reference marker in succession, with each ultrasound emitter 23 being caused to emit in succession. The ultrasound receiver base 14 thus enables the positions of the points $P_i$ of the reference marker to be determined in three dimensions in another frame of reference associated with the second position $B_2$ of the ultrasound receiver base 14. Knowledge of the positions of the points $P_i$ of the stationary reference marker in the two frames of references that are associated with the ultrasound receiver base 14 makes it possible to deduce a matrix for converting between the positions of the base 14. The coordinates of the microphones 5 can thus be expressed in a single frame of reference even when the ultrasound receiver base 14 has been moved. Naturally, the ultrasound receiver base 14 could be moved several times. In addition, it could be envisaged that the fixed reference structure 20 comprises a plurality of reference markers that are separated from one another by known distances.

The invention is not limited to the examples described and shown since various modifications can be made thereto without going beyond the ambit of the invention.

The invention claimed is:

1. An acoustic measurement installation, characterized in that it comprises:
   acoustic measurement instrumentation (3) comprising in particular an acoustic measurement antenna (4) fitted with at least one microphone (5);
   a positioning system (11) for positioning the antenna (4) by ultrasound, the positioning system comprising:
      at least one ultrasound emitter (12) mounted on the antenna at a known distance relative to the microphone;
      and an ultrasound receiver base (14) for receiving the signals emitted by each emitter and adapted to determine the position of each emitter in three dimensions;
   and a control unit (16) for controlling the positioning system (11) for positioning the antenna (4) and the acoustic measurement instrumentation (3), the control system being adapted during a first stage to cause each emitter (12) to emit in succession in order to determine the position of the antenna in three dimensions, and during a second stage to cause the microphones (5) to perform acquisition in order to implement acoustic measurement using the measurement instrumentation.

2. An acoustic measurement installation according to claim 1, characterized in that the acoustic measurement antenna (4) is fitted with an ultrasound emitter (12) when it comprises one microphone (5), with at least two ultrasound emitters (12) when it comprises a series of microphones (5) disposed linearly, with at least three ultrasound emitters (12) when it comprises a series of microphones (5) disposed in a plane, and with at least four ultrasound emitters (12) when it comprises a series of microphones (5) disposed in a volume.

3. An acoustic measurement installation according to claim 1, characterized in that each ultrasound emitter (12) is mounted on the antenna (4) on a moving support (71) for adjusting the axis of the emitter relative to the ultrasound receiver base.

4. An acoustic measurement installation according to claim 1, characterized in that the acoustic measurement antenna (4) is fitted with a member (9) for holding the antenna in position, which member is mounted to move relative to the antenna.

5. An acoustic measurement installation according to claim 1, characterized in that it includes a system (20) for positioning the receiver base (14), the system comprising:
   a fixed reference structure (21) defining at least one reference marker with at least three points (Pi);
   a moving acoustic pointer (22) fitted with at least two ultrasound emitters (23); and
   control and processor means adapted to control the ultrasound emitters (23) of the acoustic pointer (22) to emit in succession for each position of the pointer relative to the three points (Pi) of the reference marker and for each position of the receiver base (14) so as to determine the positions of the points of the reference marker in a frame of reference associated with each position of the receiver base, in order to be able to determine the positions of the antenna in a single frame of reference.

6. A method of acoustically measuring a sound source, the method being characterized in that it comprises the following steps:
   fitting an acoustic measurement antenna (4) comprising at least one microphone (5) with at least one ultrasound emitter (12) mounted at a known distance from the microphone (5);
   placing the acoustic measurement antenna (4) in a position that is stationary relative to the sound source;
   placing an ultrasound receiver base (14) to face the antenna (4), the receiver base being adapted to receive an ultrasound signal emitted by the ultrasound emitter (12) and to determine the position of the emitter (12);
   causing each ultrasound emitter (12) to emit in succession so as to enable the ultrasound receiver base (14) to determine the position of each emitter (12) and consequently of each microphone (5); and
   after the end of the stage of causing all of the ultrasound emitters (12) to emit, controlling the microphones (5) to operate in acquisition so as to perform the acoustic measurement of the sound source.

7. A method according to claim 6, characterized in that it comprises the following steps:
   placing a reference structure (21) in a stationary position, the structure defining at least one reference marker having at least three points (Pi); and
   causing each ultrasound emitter (23) of an acoustic pointer (22) fitted with at least two emitters (23) to emit in succession, and to do so for each position of the pointer (22) placed on each point (U) of the reference marker so as to enable the positions of the points of the reference marker to be determined in a frame of reference associated with the position of the ultrasound receiver base (14).

8. A method according to claim 7, characterized in that it comprises the following steps:
   moving the ultrasound receiver base (14) to place it in a second stationary position;
   causing each ultrasound emitter (23) of the pointer (22) for each position of the pointer placed on each reference point (Pi) of the reference marker to emit in succession in such a manner as to enable the positions of the points of the reference marker to be determined in another frame of reference associated with the second position of the ultrasound receiver base; and
   on the basis of the positions of the points of the reference marker for the first and second positions of the ultrasound receiver base (14), determining the positions of the microphones (5) in a single frame of reference.

9. A method according to claim 6, comprising determining the position of the emitter (12) using a direction-finding method or an interferometric method.

* * * * *